United States Patent
Takagi et al.

(10) Patent No.: US 9,903,447 B2
(45) Date of Patent: Feb. 27, 2018

(54) AUTOMATIC TRANSMISSION DEVICE FOR VEHICLE

(71) Applicant: AISIN SEIKI KABUSHIKI KAISHA, Kariya-shi, Aichi-ken (JP)

(72) Inventors: Kiyoharu Takagi, Okazaki (JP); Atsuhiro Mase, Aichi-ken (JP); Hideki Nakamura, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/198,956

(22) Filed: Jun. 30, 2016

(65) Prior Publication Data

US 2017/0037938 A1 Feb. 9, 2017

(30) Foreign Application Priority Data

Aug. 5, 2015 (JP) ................. 2015-154877

(51) Int. Cl.
  *F16H 3/66* (2006.01)
(52) U.S. Cl.
  CPC ............ *F16H 3/666* (2013.01); *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| | | | |
|---|---|---|---|
| 6,176,803 B1 * | 1/2001 | Meyer | F16H 3/666 475/276 |
| 7,364,527 B2 * | 4/2008 | Klemen | F16H 3/66 475/280 |

* cited by examiner

*Primary Examiner* — Dirk Wright
(74) *Attorney, Agent, or Firm* — Buchanan Ingersoll & Rooney PC (57) ABSTRACT

An automatic transmission device for a vehicle includes a first planetary gear mechanism, a second planetary gear mechanism, a third planetary gear mechanism, a fourth planetary gear mechanism, an input shaft, an output shaft, six engaging elements including a first engaging element, a first clutch, a second clutch, a third clutch, a first brake and a second brake, a first connection member, a second connection member, a third connection member, a fourth connection member, a fifth connection member, and a sixth connection member. Nine forward speeds and one reverse speed are provided by an engagement of three engaging elements of the six engaging elements.

8 Claims, 3 Drawing Sheets

|  | CL1 | CL2 | CL3 | B1 | B2 | M1 |
|---|---|---|---|---|---|---|
| 1st | ○ |  |  | ○ |  | ○ |
| 2nd | ○ |  |  | ○ | ○ |  |
| 3rd | ○ |  | ○ | ○ |  |  |
| 4th | ○ |  | ○ |  | ○ |  |
| 5th | ○ |  | ○ |  |  | ○ |
| 6th | ○ | ○ | ○ |  |  |  |
| 7th | ○ | ○ |  |  |  | ○ |
| 8th | ○ | ○ |  |  | ○ |  |
| 9th |  | ○ | ○ |  |  | ○ |
| 10th |  | ○ | ○ |  | ○ |  |
| Rev. |  |  | ○ | ○ |  | ○ |

AUTOMATIC TRANSMISSION DEVICE FOR VEHICLE

CROSS REFERENCE TO RELATED APPLICATIONS

This application is based on and claims priority under 35 U.S.C. § 119 to Japanese Patent Application 2015-154877, filed on Aug. 5, 2015, the entire content of which is incorporated herein by reference.

TECHNICAL FIELD

This disclosure generally relates to an automatic transmission device for a vehicle.

BACKGROUND DISCUSSION

A known automatic transmission device for a vehicle that can be provided with nine forward speeds and one reverse speed is disclosed in U.S. Pat. No. 7,364,527B (hereinafter referred to as Patent reference 1). For example, the automatic transmission device for the vehicle disclosed in Patent reference 1 includes four planetary gear mechanisms and six engaging elements. The automatic transmission device for the vehicle establishes nine forward speeds and one reverse speed by engaging two engaging elements of the six engaging elements.

According to the automatic transmission device for the vehicle disclosed in Patent reference 1, a sun gear of a first planetary gear mechanism is connected to an input shaft, and is selectively engaged with a carrier of a third planetary gear mechanism by a second clutch. A carrier of the first planetary gear mechanism is connected to a carrier of a second planetary gear mechanism and to a ring gear of the third planetary gear mechanism. The ring gear of the first planetary gear mechanism is connected to a sun gear of the second planetary gear mechanism, and is selectively fixed to a fixing member by a first brake. A ring gear of the second planetary gear mechanism is selectively fixed to the fixing member by a fourth brake. A sun gear of the third planetary gear mechanism is connected to a sun gear of a fourth planetary gear mechanism and is selectively engaged to the input shaft by a first clutch. A carrier of the third planetary gear mechanism is connected to a ring gear of the fourth planetary gear mechanism. The ring gear of the third planetary gear mechanism is selectively fixed to the fixing member by a second brake. The ring gear of the fourth planetary gear mechanism is selectively fixed to the fixing member by a third brake. A carrier of the fourth planetary gear mechanism is connected to an output shaft.

As such, according to the known automatic transmission device, the six engaging elements include two clutches that are the first clutch and the second clutch, and four brakes that are the first brake, the second brake, the third brake, and the fourth brake. The gear stages including nine forward speeds and one reverse speed are established by the engagement of two engaging elements of the six engaging elements. It is known that a housing does not rotate in a released state of the brake, and that the rotation of the housing in the released state of the brake is smaller than the rotation of the housing in the released state of the clutch. Thus, according to the known automatic transmission device, because the housing in the released state of the brake does not rotate, drag resistance at the engaging elements increases, comparing to drag resistance at the housing in the released state of the clutch. This is because the four brakes in which oil is easily retained within the housings of the brakes and drag resistance increases are provided, and because two brakes are released in a first gear stage when the vehicle runs forward, and three brakes are released in the second to ninth gear stages. Moreover, according to the known automatic transmission device, because two engaging elements of six engaging elements are engaged and other four engaging elements are released to have nine forward speeds and one reverse speed and the number of engaging elements released increases, drag resistance at the engaging elements increases. As such, because drag resistance increases, the transmission efficiency of the automatic transmission device may be prevented from being enhanced.

A need thus exists for an automatic transmission device for a vehicle which is not susceptible to the drawback mentioned above

SUMMARY

According to an aspect of this disclosure an automatic transmission device for a vehicle includes a first planetary gear mechanism including a first element, a second element, and a third element, a second planetary gear mechanism including a first element, a second element, and a third element, a third planetary gear mechanism including a first element, a second element, and a third element, a fourth planetary gear mechanism including a first element, a second element, and a third element, an input shaft, an output shaft being connected to the second element of the third planetary gear mechanism, six engaging elements including a first engaging element, a first clutch, a second clutch, a third clutch, a first brake and a second brake, a first connection member connecting the second element of the second planetary gear mechanism to the third element of the third planetary gear mechanism, a second connection member connecting the first element of the second planetary gear mechanism to the first element of the fourth planetary gear mechanism, a third connection member connecting the first element of the third planetary gear mechanism to the second element of the fourth planetary gear mechanism, a fourth connection member selectively connecting the second element of the first planetary gear mechanism to the third element of the second planetary gear mechanism, a fifth connection member selectively connecting the third element of the first planetary gear mechanism to the fixing member, and a sixth connection member selectively connecting the input shaft to the first element of the first planetary gear mechanism. The first clutch selectively connects the input shaft to the third element of the fourth planetary gear mechanism, the second clutch selectively connects the input shaft to the second element of the second planetary gear mechanism, the third clutch selectively engages two of the first element, the second element, and the third element of the fourth planetary gear mechanism, the first brake selectively connects the third element of the third planetary gear mechanism to the fixing member, the second brake selectively connects one of the second element of the first planetary gear mechanism and the third element of the second planetary gear mechanism to the fixing member, the first engaging element is disposed at a first selected connection member that is selected among the fourth connection member, the fifth connection member, and the sixth connection member, and selectively engages the first selected connection member, one of the fourth connection member, the fifth connection member, and the sixth connection member is provided with the first engaging element, and the others of the fourth connection member, the fifth connection member, and the sixth connection member that are not provided with the first engaging element, are in an engaged state, the second brake selectively connects the third element of the second planetary gear mechanism to the fixing member in a case where the fourth connection member is selected as the first selected connection member, and nine forward speeds and one reverse speed are provided by an engagement of three engaging elements of the six engaging elements.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of an automatic transmission device for a vehicle will be explained with reference to the drawings. In the embodiment, the automatic transmission device for the vehicle is used as a device that changes the speed of rotational drive force being outputted by a power source mounted on the vehicle, for example, an engine and an electric motor. The rotational drive force in which the speed is changed by the automatic transmission device for the vehicle is transmitted to steering wheels via a differential device. Accordingly, the vehicle moves forward or backward at a predetermined gear stage established by the automatic transmission device for the vehicle.

The embodiment of the automatic transmission device for the vehicle may be variously configured, and for a start, will be explained with reference to a schematic view in FIG. 1, the schematic view that shows the configuration including the various configurations. An automatic transmission device 10 for the vehicle includes an input shaft N, an output shaft T, and single-pinion-type or double pinion-type first, second, third and fourth planetary gear mechanisms P1, P2, P3, P4. The first, second, third and fourth planetary gear mechanisms P1, P2, P3, P4 are disposed in random order along the input shaft N. Alternatively, the first, second, third and fourth planetary gear mechanisms P1, P2, P3, P4 may be disposed in random order towards a direction orthogonal to an axis L of the input shaft N, that is, at the same position in an axial direction and radially outward relative to the axis L of the input shaft N.

The first, second, third and fourth planetary gear mechanisms P1, P2, P3, P4 include first elements N11, N21, N31, N41, second elements N12, N22, N32, N42, and third elements N13, N23, N33, N43, respectively. The first elements N11, N21, N31, N41 correspond to any one of a sun gear, a carrier, and a ring gear that configure a planetary gear mechanism. The second elements N12, N22, N32, N42 correspond to any one of a sun gear, a carrier, and a ring gear that configure a planetary gear mechanism. The third elements N13, N23, N33, N43 correspond to any one of a sun gear, a carrier, and a ring gear that configure a planetary gear mechanism.

The automatic transmission device 10 for the vehicle includes six engaging elements being configured by first, second, third, fourth, fifth and six engaging elements M1, M2, M3, M4, M5, M6. The first engaging element M1 is configured by a brake or a clutch in accordance with a position disposed. The second engaging element M2 is configured by a first clutch CL1. The third engaging element M3 is configured by a second clutch CL2. The fourth engaging element M4 is configured by a third clutch CL3. The fifth engaging element M5 is configured by a first brake B1. The sixth engaging element M6 is configured by a second brake B2. The first engaging element M1 is disposed at any one point of three points shown as a circle (○) in FIG. 1. The third clutch CL3 is disposed at any one point of three points shown as a quadrangle (□) in FIG. 1. The second brake B2 is disposed at any point of two points shown as a triangle (Δ) in FIG. 1. According to the automatic transmission device 10, because three engaging elements of the first, second, third, fourth, fifth and six engaging elements M1, M2, M3, M4, M5, M6 are engaged, at least nine forward speeds and one reverse speed are established.

The first elements N11, N21, N31, N41, the second elements N12, N22, N32, N42, and the third elements N13, N23, N33, N43 of the first, second, third and fourth planetary gear mechanisms P1, P2, P3, P4, respectively, are selectively connected either to any element of other planetary gear mechanisms via any one of the first, second, third, fourth, fifth, and sixth connection members J1, J2, J3, J4, J5, J6, or to any element of other planetary gear mechanisms via any one of the first, second and third clutches CL1, CL2, CL3, and the first engaging element M1. Alternatively, the first elements N11, N21, N31, N41, the second elements N12, N22, N32, N42, and the third elements N13, N23, N33, N43 of the first, second, third and fourth planetary gear mechanisms P1, P2, P3, P4, respectively, are selectively connected to a fixing member K via one of the first brake B1, the second brake B2, and the first engaging element M1.

Specifically, the automatic transmission device 10 for the vehicle includes the first connection member J1, the second connection member J2, and the third connection member J3. The first connection member J1 connects the second element N22 of the second planetary gear mechanism P2 to the third element N33 of the third planetary gear mechanism P3. The second connection member J2 connects the first element N21 of the second planetary gear mechanism P2 to the first element N41 of the fourth planetary gear mechanism P4. The third connection member J3 connects the first element N31 of the third planetary gear mechanism P3 to the second element N42 of the fourth planetary gear mechanism P4.

According to the automatic transmission device 10 for the vehicle, the second element N12 of the first planetary gear mechanism P1 is selectively connected either to the third element N23 of the second planetary gear mechanism P2 via the fourth connection member J4, or to the third element N23 of the second planetary gear mechanism P2 via the fourth connection member J4 by the first engaging element M1 when the first engaging element M1 is disposed at the fourth connection member J4. The third element N13 of the first planetary gear mechanism P1 is selectively connected either to the fixing member K via the fifth connection member J5, or to the fixing member K via the fifth connection member J5 by the first engaging element M1 when the first engaging element M1 is disposed at the fifth connection member J5. The first element N11 of the first planetary gear mechanism Pus selectively connected either to the input shaft N via the sixth connection member J6, or to the input shaft N via the sixth connection member J6 by the first engaging element M1 when the first engaging element M1 is disposed at the sixth connection member J6.

The first clutch CL1 selectively connects the input shaft N to the third element N43 of the fourth planetary gear mechanism P4. The second clutch CL2 selectively connects the input shaft N to the second element N22 of the second planetary gear mechanism P2. The third clutch CL3 selectively engages two of the first element N41, the second element N42, and the third element N43 of the fourth planetary gear mechanism P4.

The first brake B1 selectively connects the third element N33 of the third planetary gear mechanism P3 to the fixing member K. The second brake B2 selectively connects one of the second element N12 of the first planetary gear mechanism P1 and the third element N23 of the second planetary gear mechanism P2 to the fixing member K. The first engaging element M1 is disposed at a first selected connection member that is selected among the fourth connection member J4, the fifth connection member J5, and the sixth connection member J6, and selectively engages the first selected connection member. Connection members of the fourth connection member J4, the fifth connection member J5, and the sixth connection member J6, the connection members that do not include the first engagement element M1, are in an engaged state. In a case where the fourth connection member J4 is selected as the first selected connection member, the second brake B2 engageably connects the third element N23 of the second planetary gear mechanism P2 to the fixing member K. According to the automatic transmission device 10 for the vehicle, because three engaging elements of the sixth engaging elements are engaged, at least nine forward speeds and one reverse speed are established.

The third clutch CL3 integrally rotates with the fourth planetary gear mechanism P4 and needs only to engage two of the first element N41, the second element N42 and the third element N43 of the second planetary gear mechanism P4. The first engaging element M1 undertakes the transmission of the rotational drive force to the first planetary gear mechanism P1, and is disposed at the first selected connection member that is selected among the fourth connection member J4, the fifth connection member J5, and the sixth connection member J6, and needs only to selectively engage the first selected connection member.

Figure 2:
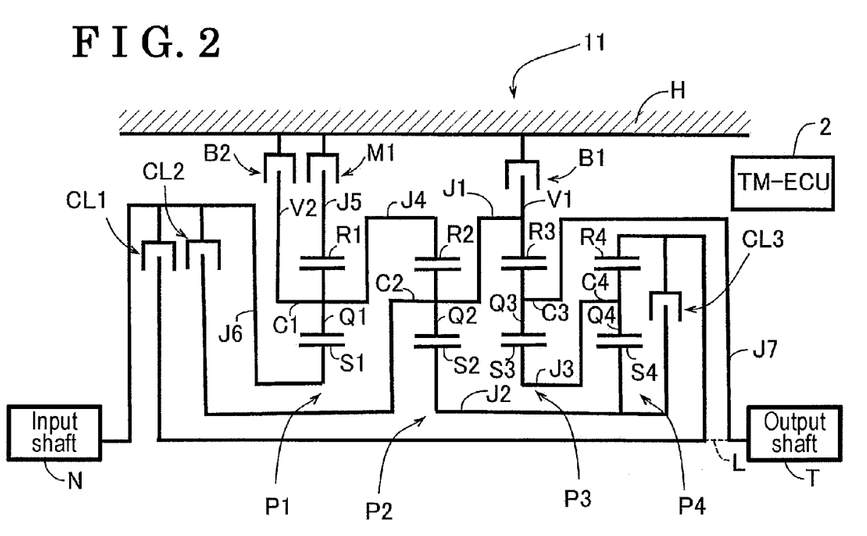
FIG. 2 is a schematic view schematically illustrating a first example of the embodiment in FIG. 1.

A first example of the automatic transmission device 10 for the vehicle of the embodiment will be explained with reference to FIG. 2.

Figure 1:
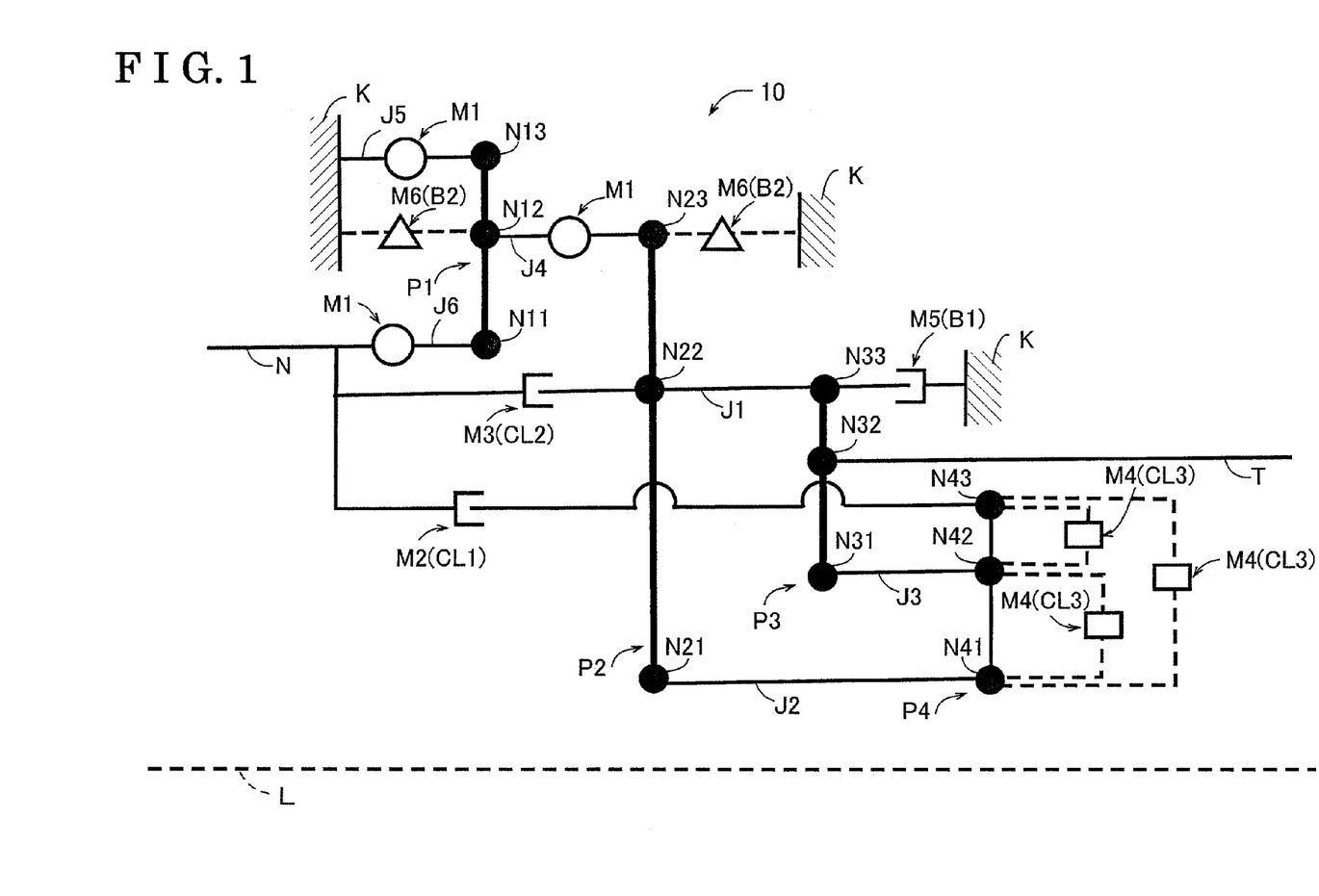
FIG. 1 is a schematic view illustrating an embodiment of an automatic transmission device for a vehicle according to an embodiment.

An automatic transmission device 11 for a vehicle includes the input shaft N, the output shaft T, the single-pinion-type first, second, third and fourth planetary gear mechanisms P1, P2, P3, P4 that are disposed next to one another along the axis L of the input shaft N from the input (left in FIG. 1) to the output (right in FIG. 1). The six engaging elements include the first, second and third clutches CL1, CL2, CL3 as three clutches, the first brake B1 and the second brake B2 as two brakes, and the first engaging element M1.

The automatic transmission device 11 for the vehicle controls operation states of the six engaging elements including the first, second and third clutches CL1, CL2, CL3, the first and second brakes B1, B2 and the first engaging element M1 based on control signals from an Electrical Control Unit 2, or ECU 2 of the vehicle. According to the embodiment, because three engaging elements of the sixth engaging elements are operated, the speed of rotational drive force inputted from the input shaft N is changed to one of nine forward speeds and one reverse speed, and may be outputted from the output shaft T.

The input shaft N and the output shaft T are rotatably supported about the axis L of the input shaft N relative to the transmission case H (i.e., serving as a fixing member). The input shaft N is a shaft member that inputs the rotational drive force of the power source, for example, an engine and an electric motor, to the automatic transmission device 11 for the vehicle for a clutch device. The output shaft T is a shaft member that is disposed coaxially with the input shaft N and that outputs the rotational drive force in which the speed is changed to drive wheels via a differential device.

Each of the first, second, third and fourth planetary gear mechanisms P1, P2, P3, P4 is a single-pinion type in which the pinion gears Q1, Q2, Q3, Q4 rotatably supported at carriers C1, C2, C3, C4, respectively, mesh with sun gears S1, S2, S3, S4, and ring gears R1, R2, R3, R4, respectively. The first, second, third and fourth planetary gear mechanisms P1, P2, P3, P4 are disposed in the aforementioned order from the input. Then, elements of the first, second, third and fourth planetary gear mechanisms P1, P2, P3, P4 correspond to the sun gears S1, S2, S3, S4, the carriers C1, C2, C3, C4, and the ring gears R1, R2, R3, R4, respectively.

According to the automatic transmission device 10 for the vehicle, because the first, second, third, and fourth planetary gear mechanisms P1, P2, P3, P4 are single-pinion types, the sun gears S1, S2, S3, S4 correspond to the first elements N11, N21, N31, N41 in FIG. 1, respectively, the carriers C1, C2, C3, C4 correspond to the second elements N12, N22, N32, N42 in FIG. 1, respectively, and the ring gears R1, R2, R3, R4 correspond to the third elements N13, N23, N33, N43 in FIG. 1, respectively.

The first planetary gear mechanism P1 is configured by the sun gear S1, the ring gear R1, and the carrier C1. The sun gear Si is coaxially and rotatably supported at the axis L. The carrier C1 supports the first pinion gear Q1 that meshes with the sun gear S1 and the ring gear R1. The second planetary gear mechanism P2 is configured by the sun gear S2, the ring gear R2, and the carrier C2. The sun gear S2 is coaxially and rotatably supported at the axis L. The carrier C2 supports the second pinion gear Q2 that meshes with the sun gear S2 and the ring gear R2. The third planetary gear mechanism P3 is configured by the sun gear S3, the ring gear R3, and the carrier C3. The sun gear S3 is coaxially and rotatably supported at the axis L. The carrier C3 supports the third pinion gear Q3 that meshes with the sun gear S3 and the ring gear R3. The fourth planetary gear mechanism P4 is configured by the sun gear S4, the ring gear R4, and the carrier C4. The sun gear S4 is coaxially and rotatably supported at the axis L. The carrier C4 supports the fourth pinion gear Q4 that meshes with the sun gear S4 and the ring gear R4.

Each of the first and second brakes B1, B2 and the firs engaging element M1 is provided at the transmission case H, and corresponds to an engaging element that brakes the rotation of the predetermined element. Similarly to the first, second and third clutches CL1, CL2, CL3, each of the first brake B1, the second brake B2, and the first engaging element M1 is an oil-pressure type operating in response to the oil pressure supplied from an oil passage formed at the transmission case H. Accordingly, when the oil pressure is supplied from the oil pressure pump operating in response to, for example, a control demand of the ECU2, each of the first brake B1, the second brake B2, and the first engaging element M1 presses a pad to a disk and brakes the rotation of the targeted predetermined element. When the supply of the oil pressure by the oil pump is cut off, each of the first brake B1, the second brake B2, and the first engaging element M1 separates the pad from the disk, and allows the rotation of the predetermined element.

Each of the first, second and third clutches CL1, CL2, CL3 corresponds to an engaging element that selectively engages plural elements. According to the embodiment, each of the first, second and third clutches CL1, CL2, CL3 is a normally-open type and is an oil-pressure type operating in response to the supplied oil pressure. Accordingly, when the oil pressure is supplied via the oil passages formed at the input shaft N and the transmission case H from the oil pressure pump operating in response to, for example, the control command of the ECU 2, the first, second and third clutches CL1, CL2, CL3 come in contact with plural clutch plates and connect the elements in order to transmit the drive force between the targeted elements. When the supply of the oil pressure by the oil pressure pump is cut off, each of the first, second and third clutches CL1, CL2, CL3 separates the clutch plates and disengages the elements in order not to transmit the drive force between the targeted elements.

Next, the connection state of the automatic transmission device 11 for the vehicle will be explained. The automatic transmission device 11 for the vehicle includes the first connection member J1, the second connection member J2, and the third connection member J3. The first connection member J1 connects the carrier C2 of the second planetary gear mechanism P2 to the ring gear R3 of the third planetary gear mechanism P3. The second connection member J2 connects the sun gear S2 of the second planetary gear mechanism P2 to the sun gear S4 of the fourth planetary gear mechanism P4. The third connection member J3 connects the sun gear S3 of the third planetary gear mechanism P3 to the carrier C4 of the fourth planetary gear mechanism P4.

According to the automatic transmission device 11 for the vehicle, the fourth connection member J4 connects the carrier C1 of the first planetary gear mechanism P1 to the ring gear R2 of the second planetary gear mechanism P2. The fifth connection member J5 selectively connects the ring gear R1 of the first planetary gear mechanism P1 to the transmission case H when the first engaging element M1 is disposed. The sixth connection member J6 connects the sun gear S1 of the first planetary gear mechanism P1 to the input shaft N. The automatic transmission device 11 for the vehicle includes a seventh connection member J7 that connects the output shaft T to the carrier C3 of the third planetary gear mechanism P3.

The first brake B1 connects a first brake connection member V1 selectively provided relative to the transmission case H to the ring gear R3 of the third planetary gear mechanism P3, and brakes the rotation of the ring gear R3. The second B2 connects a second brake connection member V2 selectively provided relative to the transmission case H to the carrier C1 of the first planetary gear mechanism P1, and brakes the rotation of the carrier C1.

The first clutch CL1 selectively connects the input shaft N to the ring gear R4 of the fourth planetary gear mechanism P4. The second clutch CL2 selectively connects the input shaft N to the carrier C2 of the second planetary gear mechanism P2. The third clutch CL3 selectively connects the sun gear S4 of the fourth planetary gear mechanism P4 to the ring gear R4 of the fourth planetary gear mechanism P4. The first engaging element M1 is disposed at the fifth connection member J5 (i.e., serving as a first selected connection member), and selectively engages the fifth connection member J5, that is, selectively connects the ring gear R1 (i.e., serving as a third element) of the first planetary gear mechanism P1 to the transmission case H (i.e., serving as a fixing member). Accordingly, the first engaging element M1 acts as a brake by being engaged, and brakes the rotation of the ring gear R1 of the first planetary gear mechanism P1.

Figure 3:
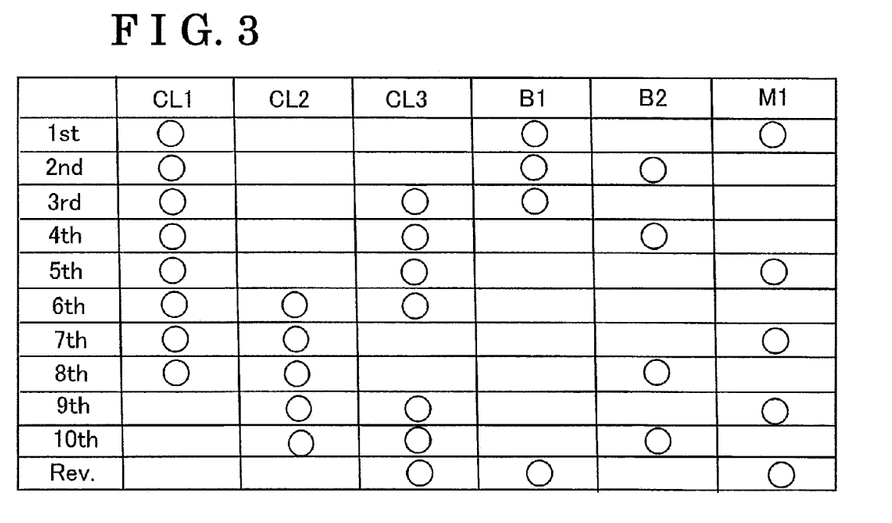
FIG. 3 is a view illustrating operation states of a brake and clutches of each gear stage of the first example of the embodiment in FIG. 2.

The automatic transmission device 11 for the vehicle, as shown in FIG. 3, restricts the rotation of the elements of the first, second, third and fourth planetary gear mechanisms P1, P2, P3, P4 by selectively engaging three engaging elements of the six engaging elements including the first, second and third clutches CL1, CL2, CL3, the first and second brakes B1, B2 and the first engaging element M1. Accordingly, the automatic transmission device 11 for the vehicle may be provided with the gear stages of 10 forward speeds and 1 reverse speed. FIG. 3 illustrates the operation states of the first, second and third clutches CL1, CL2, CL3, the first and second brakes B1, B2 and the first engaging element M1. Circles indicate the engaged states of the first, second and third clutches CL1, CL2, CL3, the first and second brakes B1, B2 and the first engaging element M1.

Figure 4:
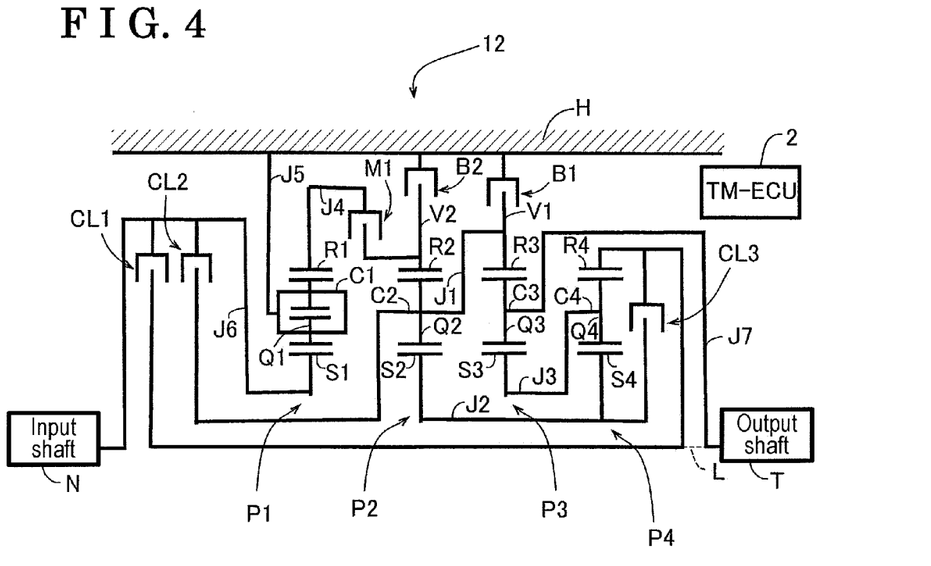
FIG. 4 is a schematic view schematically illustrating a second example of the embodiment in FIG. 1.

Next, a second example of the automatic transmission device 10 for the vehicle will be explained with reference to FIG. 4 that corresponds to FIG. 2 of the first example of the automatic transmission device 11 for the vehicle. In FIG. 4, the same components as those described in the automatic transmission device 11 for the vehicle in FIG. 2 are marked with the same reference numerals, and the description will not be explained. According to an automatic transmission device 12 for a vehicle, the second brake B2 selectively connects the ring gear R2 of the second planetary gear mechanism P2 to the transmission case H. This is the point that is different from the automatic transmission device 11 for the vehicle of the first example. Accordingly, the second brake B2 connects the second brake connection member V2 to the ring gear R2 of the second planetary gear mechanism P2, and brakes the rotation of the ring gear R2.

According to the automatic transmission device 12 for the vehicle, the first planetary gear mechanism P1 corresponds to a double-pinion type. This is the point that is different from the automatic transmission device 11 for the vehicle of the first example. Because the automatic transmission device 12 of the second example uses the double-pinion-type first planetary gear mechanism P1, the sun gear S1 of the first planetary gear mechanism P1 corresponds to the first element N11, the ring gear R1 of the first planetary gear mechanism P1 corresponds to the second element N12, and the carrier C1 of the first planetary gear mechanism P1 corresponds to the third element N13. Accordingly, according to the automatic transmission device 12 for the vehicle, the carrier C1 of the first planetary gear mechanism P1 is connected to the transmission case H via the fifth connection member J5. The sun gear S1 of the first planetary gear mechanism P1 is connected to the input shaft N via the sixth connection member J6. The ring gear R1 of the first planetary gear mechanism P1 is connected to the ring gear R2 of the second planetary gear mechanism P2 via the fourth connection member J4.

According to the automatic transmission device 12 for the vehicle, the first engaging element M1 is disposed at the fourth connection member J4 (i.e., serving as a first selected connection member), and selectively engages the fourth connection member J4. That is, the ring gear R1 (i.e., serving as a second element) of the first planetary gear mechanism P1 is selectively connected to the ring gear R2 of the second planetary gear mechanism P2. This is the point that is different from the automatic transmission device 11 for the vehicle of the first example. Accordingly, the first engaging element M1 of the automatic transmission device 12 for the vehicle acts as a clutch.

Similarly to the automatic transmission device 11 for the vehicle of the first example, the automatic transmission device 12 for the vehicle, as shown in FIG. 3, restricts the rotation of the elements of the first, second, third and fourth planetary gear mechanisms P1, P2, P3, P4 by selectively engaging three engaging elements of the six engaging elements including the first, second and third clutches CL1, CL2, CL3, the first and second brakes B1, B2, and the first engaging element M1. Accordingly, the automatic transmission device 12 for the vehicle may be provided with the gear stages of 10 forward speeds and 1 reverse speed.

Figure 5:
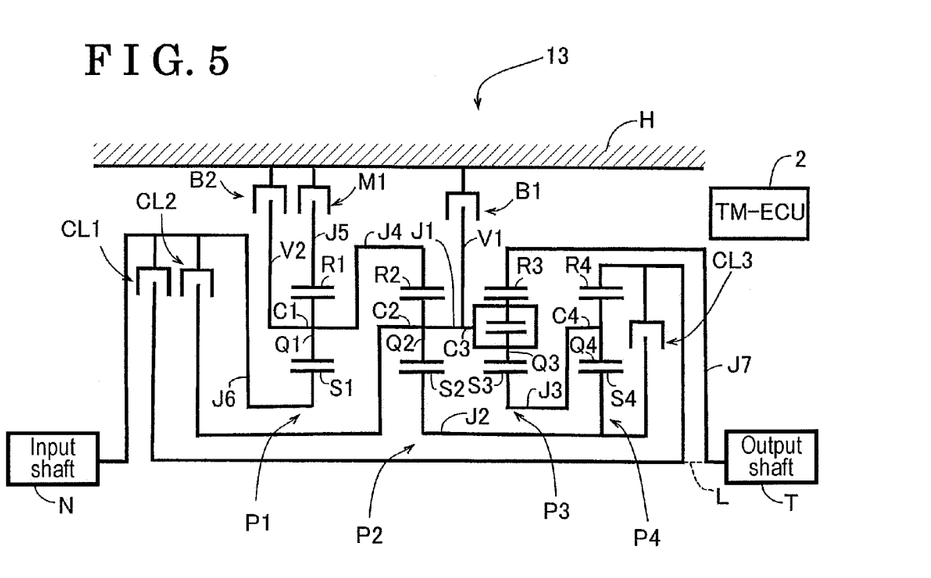
FIG. 5 is a schematic view schematically illustrating a third example of the embodiment in FIG. 1.

Next, a third example of the automatic transmission device 10 for the vehicle of the embodiment will be explained with reference to FIG. 5 that corresponds to FIG. 2 of the first example of the automatic transmission device 11 for the vehicle. In FIG. 5, the same components as those described in the automatic transmission device 11 for the vehicle shown in FIG. 2 are marked with the same reference numerals, and the description will not be explained. According to an automatic transmission device 13 for the vehicle, the third planetary gear mechanism P3 corresponds to a double-pinion type. This is the point that is different from the automatic transmission device 11 for the vehicle of the first example. Because the automatic transmission device 13 of the third example uses the double-pinion-type third planetary gear mechanism P3, the sun gear S3 of the third planetary gear mechanism P3 corresponds to the first element N31, the ring gear R3 of the third planetary gear mechanism P3 corresponds to the second element N32, and the carrier O3 of the third planetary gear mechanism P3 corresponds to the third element N33. Accordingly, according to the automatic transmission device 13 for the vehicle, the sun gear S3 of the third planetary gear mechanism P3 is connected to the carrier C4 of the fourth planetary gear mechanism P4 via the third connection member J3. The carrier C3 of the third planetary gear mechanism P3 is connected to the carrier C2 of the second planetary gear mechanism P2 via the first connection member J1, and is selectively connected to the transmission case H via the first brake B1. The ring gear R3 of the third planetary gear mechanism P3 is connected to the output shaft T via the seventh connection member J7.

Similarly to the automatic transmission device 11 for the vehicle, the automatic transmission device 13 for the vehicle, as shown in FIG. 3, restricts the rotation of the elements of the first, second, third and fourth planetary gear mechanisms P1, P2, P3, P4 by selectively engaging three engaging elements of the six engaging elements including the first, second and third clutches CL1, CL2, CL3, the first and second brakes B1, B2 and the first engaging element M1. Accordingly, the automatic transmission device 13 for the vehicle may be provided with the gear stages of 10 forward speeds and 1 reverse speed.

As mentioned above, the automatic transmission device 10 (11, 12, 13) of the embodiment includes the first, second, third and fourth planetary gear mechanisms P1, P2, P3, P4 that include the first elements N11, N21, N31, N41, the second elements N12, N22, N32, N42, and the third elements N13, N23, N33, N43, respectively. The automatic transmission device 10 (11, 12, 13) further includes the input shaft N, the output shaft T that is connected to the second element N32 of the third planetary gear mechanism P3, and the six engaging elements including the first, second and third clutches CL1, CL2, CL3, the first and second brakes B1, B2, and the first engaging element M1. The automatic transmission device 10 (11, 12, 13) further includes the first second, third, fourth, fifth, and sixth connection members J1, J2, J3, J4, J5, J6. The first connection member J1 connects the second element N22 of the second planetary gear mechanism P2 to the third element N33 of the third planetary gear mechanism P3. The second connection member J2 connects the first element N21 of the second planetary gear mechanism P2 to the first element N41 of the fourth planetary gear mechanism P4. The third connection member J3 connects the first element N31 of the third planetary gear mechanism P3 to the second element N42 of the fourth planetary gear mechanism P4. The fourth connection member J4 can either connect or selectively connect the second element N12 of the first planetary gear mechanism P1 to the third element N23 of the second planetary gear mechanism P2. The fifth connection member J5 can either connect or selectively connect the third element N13 of the first planetary gear mechanism P1 to the fixing member K (the transmission case H). The sixth connection member J6 can either connect or selectively connect the input shaft N to the first element N11 of the first planetary gear mechanism P1. The first clutch CL1 selectively connects the input shaft N to the third element N43 of the fourth planetary gear mechanism P4. The second clutch CL2 selectively connects the input shaft N to the second element N22 of the second planetary gear mechanism P2. The third clutch CL3 selectively engages two of the first element N41, the second element N42 and the third element N43 of the fourth planetary gear mechanism P4. The first brake B1 selectively connects the third element N33 of the third planetary gear mechanism P3 to the fixing member K (the transmission case H). The second brake B2 selectively connects one of the second element N12 of the first planetary gear mechanism P1 and the third element N23 of the second planetary gear mechanism P2 to the fixing member K (the transmission case H). The first engaging element M1 is disposed at the first selected connection member that is selected among the fourth, fifth and sixth connection members J4, J5, J6, and selectively engages the first selected connection member. The connection members of the fourth, fifth and sixth connection member J4, J5 and J6, the connection members that do not include the first engaging element Ml, are in an engaged state. In a case where the fourth connection member J4 is selected as the first selected connection member, the second brake B2 selectively connects the third element N23 of the second planetary gear mechanism P2 to the fixing member K (the transmission case H). By the engagement of three engaging elements of the six engaging elements, at least nine forward speeds and one reverse speed are provided. Accordingly, the six engaging elements correspond to the first, second and third clutches CL1, CL2, CL3, the first and second brakes B1, B2, and the first engaging element M1. Because the first engaging element M1 acts as a brake or a clutch in accordance with the position disposed, three clutches and three brakes, or four clutches and two brakes is established. By the engagement of three engaging elements of the six engaging elements, at least nine forward speeds and one reverse speed are provided. Accordingly, comparing to the clutch, the number of the brake that increases the sliding resistance in a released state may be three pieces or two pieces subtracted by, at least, one. Accordingly, the drag resistance at the engaging element may be reduced. As a result, because the drag resistance at the engaging element is reduced, the transmission efficiency of the transmission may be enhanced.

The automatic transmission device 10 (11, 12, 13) of the embodiment includes the first, second, third and fourth planetary gear mechanisms P1, P2, P3, P4 that are disposed along the axis L of the input shaft T. Accordingly, the flexibility of the configuration of the automatic transmission device 10 (11, 12, 13), the configuration that is compacted in a direction orthogonal to the axis L of the input shaft T, is enhanced.

According to the automatic transmission device 10 (11) for the vehicle of the embodiment, each of the first planetary gear mechanism P1, the second planetary gear mechanism P2, the third planetary gear mechanism P3, and the fourth planetary gear mechanism P4 corresponds to a single-pinion-type planetary gear mechanism. Each of the first element N11 of the first planetary gear mechanism P1, the first element N12 of the second planetary gear mechanism P2, the first element N31 of the third planetary gear mechanism, the first element N41 of the fourth planetary gear mechanism P4 corresponds to a sun gear. Each of the second element N12 of the first planetary gear mechanism P1, the second element N22 of the second planetary gear mechanism P2, the second element N32 of the third planetary gear mechanism P3, the second element N42 of the fourth planetary gear mechanism P4 corresponds to a carrier. Each of the third element N13 of the first planetary gear mechanism P1, the third element N23 of the second planetary gear mechanism P2, the third element N33 of the third planetary gear mechanism P3, and the third element N43 of the fourth planetary gear mechanism P4 corresponds to a ring gear. Accordingly, the automatic transmission device 10 (11) for the vehicle may be configured by the single-pinion-type planetary gear mechanism only.

According to the automatic transmission device 10 (12) for the vehicle of the embodiment, the first planetary gear mechanism P1 corresponds to a double-pinion-type planetary gear mechanism. Each of the second, third and fourth planetary gear mechanisms P2, P3, P4 corresponds to a single-pinion-type planetary gear mechanism. Each of the first element N11 of the first planetary gear mechanism P1, the first element N12 of the second planetary gear mechanism P2, the first element N31 of the third planetary gear mechanism, the first element N41 of the fourth planetary gear mechanism P4 corresponds to a sun gear. Each of the third element N13 of the first planetary gear mechanism P1, the second element N22 of the second planetary gear mechanism P2, the second element N32 of the third planetary gear mechanism P3, and the second element N42 of the fourth planetary gear mechanism P4 corresponds to a carrier. Each of the second element N12 of the first planetary gear mechanism P1, the third element N23 of the second planetary gear mechanism P2, the third element N33 of the third planetary gear mechanism P3, and the third element N43 of the fourth planetary gear mechanism P4 corresponds to a ring gear. Accordingly, the automatic transmission device 10 (12) for the vehicle may be configured by the combination of the three single-pinion-type planetary gear mechanisms and the double-pinion-type planetary gear mechanism.

According to the automatic transmission device 10 (13) for the vehicle of the embodiment, the third planetary gear mechanism P3 corresponds to a double-pinion-type planetary gear mechanism. Each of the first, second and fourth planetary gear mechanisms P1, P2, P4 corresponds to a single-pinion-type planetary gear mechanism. Each of the first element N11 of the first planetary gear mechanism P1, the first element N12 of the second planetary gear mechanism P2, the first element N31 of the third planetary gear mechanism, the first element N41 of the fourth planetary gear mechanism P4 corresponds to a sun gear. Each of the second element N12 of the first planetary gear mechanism P1, the second element N22 of the second planetary gear mechanism P2, the third element N33 of the third planetary gear mechanism P3, and the second element N42 of the fourth planetary gear mechanism P4 corresponds to a carrier. Each of the third element N13 of the first planetary gear mechanism P1, the third element N23 of the second planetary gear mechanism P2, the second element N23 of the third planetary gear mechanism P3, and the third element N43 of the fourth planetary gear mechanism P4 corresponds to a ring gear. Accordingly, the automatic transmission device 10 (13) may be configured by the combination of the three single-pinion-type planetary gear mechanisms and the double-pinion-type planetary gear mechanism.

In a case where the plural embodiments are provided, it is clear that the characteristics of the embodiments may be appropriately combined with one another except for the case where any specific description is made.

According to the aforementioned embodiment, the automatic transmission device (10, 11, 12, 13) for the vehicle includes the first planetary gear mechanism (P1) including the first element (N11), the second element (N12), and the third element (N13), the second planetary gear mechanism (P2) including the first element (N21), the second element (N22), and the third element (N23), the third planetary gear mechanism (P3) including the first element (N31), the second element (N32), and the third element (N33), the fourth planetary gear mechanism (P4) including the first element (N41), the second element (N42), and the third element (N43), the input shaft (N), the output shaft (T) being connected to the second element (N32) of the third planetary gear mechanism (P3), the six engaging elements including the first engaging element (M1), the first clutch (CL1), the second clutch (CL2), the third clutch (CL3), the first brake (B1) and the second brake (B2), the first connection member (J1) connecting the second element (N22) of the second planetary gear mechanism (P2) to the third element (N33) of the third planetary gear mechanism (P3), the second connection member (J2) connecting the first element (N21) of the second planetary gear mechanism (P2) to the first element (N41) of the fourth planetary gear mechanism (P4), the third connection member (J3) connecting the first element (N31) of the third planetary gear mechanism (P3) to the second element (N42) of the fourth planetary gear mechanism (P4), the fourth connection member (J4) selectively connecting the second element (N12) of the first planetary gear mechanism (P1) to the third element (N23) of the second planetary gear mechanism (P2), the fifth connection member (J5) selectively connecting the third element (N13) of the first planetary gear mechanism (P1) to the fixing member (K), and the sixth connection member (J6) selectively connecting the input shaft (N) to the first element (N11) of the first planetary gear mechanism (P1). The first clutch (CL1) selectively connects the input shaft (N) to the third element (N43) of the fourth planetary gear mechanism (P4), the second clutch (CL2) selectively connects the input shaft (N) to the second element (N22) of the second planetary gear mechanism P2), the third clutch (CL3) selectively engages two of the first element (N41), the second element (N42), and the third element (N43) of the fourth planetary gear mechanism (P4), the first brake (B1) selectively connects the third element (N33) of the third planetary gear mechanism (P3) to the fixing member (K) (transmission case H), the second brake (B2) selectively connects one of the second element (N12) of the first planetary gear mechanism (P1) and the third element (N23) of the second planetary gear mechanism (P2) to the fixing member (K) (transmission case H), the first engaging element (M1) is disposed at a first selected connection member (J4, J5, J6) that is selected among the fourth connection member (J4), the fifth connection member (J5), and the sixth connection member (J6), and selectively engages the first selected connection member (J4, J5, J6), one of the fourth connection member (J4), the fifth connection member (J5), and the sixth connection member (J6) is provided with the first engaging element (M1), and the others of the fourth connection member (J4), the fifth connection member (J5), and the sixth connection member (J6) that are not provided with the first engaging element (M1), are in an engaged state, the second brake (B2) selectively connects the third element (N23) of the second planetary gear mechanism (P2) to the fixing member (K) (transmission case H) in a case where the fourth connection member (J4) is selected as the first selected connection member (J4, J5, J6), and nine forward speeds and one reverse speed are provided by an engagement of three engaging elements of the six engaging elements.

Accordingly, the six engaging elements correspond to the first, second and third clutches CL1, CL2, CL3, the first and second brakes B1, B2, and the first engaging element M1. Because the first engaging element M1 acts as a brake or a clutch in accordance with the position disposed, three clutches and three brakes, or four clutches and two brakes is established. By the engagement of three engaging elements of the six engaging elements, at least nine forward speeds and one reverse speed are provided. Accordingly, comparing to the clutch, the number of the brake that increases the sliding resistance in a released state may be three pieces or two pieces subtracted by, at least, one. Accordingly, the drag resistance at the engaging element may be reduced. As a result, because the drag resistance at the engaging element is reduced, the transmission efficiency of the transmission may be enhanced.

According to the aforementioned embodiment, the first planetary gear mechanism (P1), the second planetary gear mechanism (P2), the third planetary gear mechanism (P3), and the fourth planetary gear mechanism (P4) are disposed in random order along an axis (L) of the input shaft (N).

According to the aforementioned embodiment, each of the first planetary gear mechanism (P1), the second planetary gear mechanism (P2), the third planetary gear mechanism (P3), and the fourth planetary gear mechanism (P4) corresponds to a single-pinion-type planetary gear mechanism, each of the first element (N11) of the first planetary gear mechanism (P1), the first element (N21) of the second planetary gear mechanism (P2), the first element (N31) of the third planetary gear mechanism (P3), and the first element (N14) of the fourth planetary gear mechanism (P4) corresponds to a sun gear (S1, S2, S3, S4), each of the second element (N12) of the first planetary gear mechanism (P1), the second element (N22) of the second planetary gear mechanism (P2), the second element (N32) of the third planetary gear mechanism (P3), and the second element (N42) the fourth planetary gear mechanism (P4) corresponds to a carrier (C1, C2, C3, C4), and each of the third element (N13) of the first planetary gear mechanism (P1), the third element (N23) of the second planetary gear mechanism (P2), the third element (N33) of the third planetary gear mechanism (P3), and the third element (N43) of the fourth planetary gear mechanism (P4) corresponds to a ring gear (R1, R2, R3, R4).

According to the aforementioned embodiment, the first planetary gear mechanism (P1) corresponds to a double-pinion-type mechanism, each of the second planetary gear mechanism (P2), the third planetary gear mechanism (P3), and the fourth planetary gear mechanism (P4) corresponds to a single-pinion-type planetary gear mechanism, each of the first element (N11) of the first planetary gear mechanism (P1), the first element (N21) of the second planetary gear mechanism (P2), the first element (N31) of the third planetary gear mechanism (P3), and the first element (N14) of the fourth planetary gear mechanism (P4) corresponds to a sun gear (S1, S2, S3, S4), each of the third element (N13) of the first planetary gear mechanism (P1), the second element (N22) of the second planetary gear mechanism (P2), the second element (N32) of the third planetary gear mechanism (P3), and the second element (N42) of the fourth planetary gear mechanism (P4) corresponds to a carrier (C1, C2, C3, C4), and each of the second element (N12) of the first planetary gear mechanism (P1), the third element (N23) of the second planetary gear mechanism (P2), the third element (N33) of the third planetary gear mechanism (P3), and the third element (N43) of the fourth planetary gear mechanism (P4) corresponds to a ring gear (R1, R2, R3, R4).

According to the aforementioned embodiment, each of the first planetary gear mechanism (P1), the second planetary gear mechanism (P2) and the fourth planetary gear mechanism (P4) corresponds to a single-pinion-type mechanism, the third planetary gear mechanism (P3) corresponds to a double-pinion-type planetary gear mechanism, each of the first element (N11) of the first planetary gear mechanism (P1), the first element (N21) of the second planetary gear mechanism (P2), the first element (N31) of the third planetary gear mechanism (P3), and the first element (N14) of the fourth planetary gear mechanism (P4) corresponds to a sun gear (S1, S2, S3, S4), each of the second element (N12) of the first planetary gear mechanism (P1), the second element (N22) of the second planetary gear mechanism (P2), the third element (N33) of the third planetary gear mechanism (P3), and the second element (N42) of the fourth planetary mechanism (P4) corresponds to a carrier (C1, C2, C3, C4), and each of the third element (N13) of the first planetary gear mechanism (P1), the third element (N22) of the second planetary gear mechanism (P2), the second element (N32) of the third planetary gear mechanism (P3), and the third element (N43) of the fourth planetary gear mechanism (P) corresponds to a ring gear (R1, R2, R3, R4).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic transmission device for a vehicle comprising:
   a first planetary gear mechanism including a first element, a second element, and a third element;
   a second planetary gear mechanism including a first element, a second element, and a third element;
   a third planetary gear mechanism including a first element, a second element, and a third element;
   a fourth planetary gear mechanism including a first element, a second element, and a third element;

an input shaft;

an output shaft being connected to the second element of the third planetary gear mechanism;

six engaging elements including a first engaging element, a first clutch, a second clutch, a third clutch, a first brake and a second brake;

a first connection member connecting the second element of the second planetary gear mechanism to the third element of the third planetary gear mechanism;

a second connection member connecting the first element of the second planetary gear mechanism to the first element of the fourth planetary gear mechanism;

a third connection member connecting the first element of the third planetary gear mechanism to the second element of the fourth planetary gear mechanism;

a fourth connection member selectively connecting the second element of the first planetary gear mechanism to the third element of the second planetary gear mechanism;

a fifth connection member selectively connecting the third element of the first planetary gear mechanism to the fixing member; and a sixth connection member selectively connecting the input shaft to the first element of the first planetary gear mechanism; wherein the first clutch selectively connects the input shaft to the third element of the fourth planetary gear mechanism;

the second clutch selectively connects the input shaft to the second element of the second planetary gear mechanism;

the third clutch selectively engages two of the first element, the second element, and the third element of the fourth planetary gear mechanism;

the first brake selectively connects the third element of the third planetary gear mechanism to the fixing member;

the second brake selectively connects one of the second element of the first planetary gear mechanism and the third element of the second planetary gear mechanism to the fixing member;

the first engaging element is disposed at a first selected connection member that is selected among the fourth connection member, the fifth connection member, and the sixth connection member, and selectively engages the first selected connection member;

one of the fourth connection member, the fifth connection member, and the sixth connection member is provided with the first engaging element, and the others of the fourth connection member, the fifth connection member, and the sixth connection member that are not provided with the first engaging element, are in an engaged state;

the second brake selectively connects the third element of the second planetary gear mechanism to the fixing member in a case where the fourth connection member is selected as the first selected connection member; and at least nine forward speeds and one reverse speed are provided by an engagement of three engaging elements of the six engaging elements.

2. The automatic transmission device for the vehicle according to claim 1, wherein the first planetary gear mechanism, the second planetary gear mechanism, the third planetary gear mechanism, and the fourth planetary gear mechanism are disposed in random order along an axis of the input shaft.

3. The automatic transmission device for the vehicle according to claim 1, wherein each of the first planetary gear mechanism, the second planetary gear mechanism, the third planetary gear mechanism, and the fourth planetary gear mechanism corresponds to a single-pinion-type planetary gear mechanism;

each of the first element of the first planetary gear mechanism, the first element of the second planetary gear mechanism, the first element of the third planetary gear mechanism, and the first element of the fourth planetary gear mechanism corresponds to a sun gear;

each of the second element of the first planetary gear mechanism, the second element of the second planetary gear mechanism, the second element of the third planetary gear mechanism, and the second element of the fourth planetary gear mechanism corresponds to a carrier; and each of the third element of the first planetary gear mechanism, the third element of the second planetary gear mechanism, the third element of the third planetary gear mechanism, and the third element of the fourth planetary gear mechanism corresponds to a ring gear.

4. The automatic transmission device for the vehicle according to claim 2, wherein each of the first planetary gear mechanism, the second planetary gear mechanism, the third planetary gear mechanism, and the fourth planetary gear mechanism corresponds to a single-pinion-type planetary gear mechanism;

each of the first element of the first planetary gear mechanism, the first element of the second planetary gear mechanism, the first element of the third planetary gear mechanism, and the first element of the fourth planetary gear mechanism corresponds to a sun gear;

each of the second element of the first planetary gear mechanism, the second element of the second planetary gear mechanism, the second element of the third planetary gear mechanism, and the second element of the fourth planetary gear mechanism corresponds to a carrier; and each of the third element of the first planetary gear mechanism, the third element of the second planetary gear mechanism, the third element of the third planetary gear mechanism, and the third element of the fourth planetary gear mechanism corresponds to a ring gear.

5. The automatic transmission device for the vehicle according to claim 1, wherein the first planetary gear mechanism corresponds to a double-pinion-type mechanism;

each of the second planetary gear mechanism, the third planetary gear mechanism, and the fourth planetary gear mechanism corresponds to a single-pinion-type planetary gear mechanism:

each of the first element of the first planetary gear mechanism, the first element of the second planetary gear mechanism, the first element of the third planetary gear mechanism, and the first element of the fourth planetary gear mechanism corresponds to a sun gear;

each of the third element of the first planetary gear mechanism, the second element of the second planetary gear mechanism, the second element of the third planetary gear mechanism, and the second element of the fourth planetary gear mechanism corresponds to a carrier; and each of the second element of the first planetary gear mechanism, the third element of the second planetary gear mechanism, the third element of the third planetary gear mechanism, and the third element of the fourth planetary gear mechanism corresponds to a ring gear.

6. The automatic transmission device for the vehicle according to claim 2, wherein
the first planetary gear mechanism corresponds to a double-pinion-type mechanism;
each of the second planetary gear mechanism, the third planetary gear mechanism, and the fourth planetary gear mechanism corresponds to a single-pinion-type planetary gear mechanism:
each of the first element of the first planetary gear mechanism, the first element of the second planetary gear mechanism, the first element of the third planetary gear mechanism, and the first element of the fourth planetary gear mechanism corresponds to a sun gear;
each of the third element of the first planetary gear mechanism, the second element of the second planetary gear mechanism, the second element of the third planetary gear mechanism, and the second element of the fourth planetary gear mechanism corresponds to a carrier; and
each of the second element of the first planetary gear mechanism, the third element of the second planetary gear mechanism, the third element of the third planetary gear mechanism, and the third element of the fourth planetary gear mechanism corresponds to a ring gear.

7. The automatic transmission device for the vehicle according to claim 1, wherein
each of the first planetary gear mechanism, the second planetary gear mechanism and the fourth planetary gear mechanism corresponds to a single-pinion-type mechanism;
the third planetary gear mechanism corresponds to a double-pinion-type planetary gear mechanism;
each of the first element of the first planetary gear mechanism, the first element of the second planetary gear mechanism, the first element of the third planetary gear mechanism, and the first element of the fourth planetary gear mechanism corresponds to a sun gear;
each of the second element of the first planetary gear mechanism, the second element of the second planetary gear mechanism, the third element of the third planetary gear mechanism, and the second element of the fourth planetary mechanism corresponds to a carrier; and
each of the third element of the first planetary gear mechanism, the third element of the second planetary gear mechanism, the second element of the third planetary gear mechanism, and the third element of the fourth planetary gear mechanism corresponds to a ring gear.

8. The automatic transmission device for the vehicle according to claim 2, wherein
each of the first planetary gear mechanism, the second planetary gear mechanism and the fourth planetary gear mechanism corresponds to a single-pinion-type mechanism;
the third planetary gear mechanism corresponds to a double-pinion-type planetary gear mechanism;
each of the first element of the first planetary gear mechanism, the first element of the second planetary gear mechanism, the first element of the third planetary gear mechanism, and the first element of the fourth planetary gear mechanism corresponds to a sun gear;
each of the second element of the first planetary gear mechanism, the second element of the second planetary gear mechanism, the third element of the third planetary gear mechanism, and the second element of the fourth planetary mechanism corresponds to a carrier; and
each of the third element of the first planetary gear mechanism, the third element of the second planetary gear mechanism, the second element of the third planetary gear mechanism, and the third element of the fourth planetary gear mechanism corresponds to a ring gear.

* * * * *